(12) United States Patent
Pradhan et al.

(10) Patent No.: US 6,635,313 B2
(45) Date of Patent: Oct. 21, 2003

(54) METHOD FOR COATING A STEEL ALLOY

(75) Inventors: Rajendra Pradhan, Nazareth, PA (US); C. Ramadeva Shastry, Bethlehem, PA (US)

(73) Assignee: ISG Technologies, Inc., Richfield, OH (US)

( * ) Notice: Subject to any disclaimer, the term of this patent is extended or adjusted under 35 U.S.C. 154(b) by 0 days.

(21) Appl. No.: 10/016,062

(22) Filed: Nov. 15, 2001

(65) Prior Publication Data

US 2003/0091857 A1 May 15, 2003

(51) Int. Cl.$^7$ .............................. B05D 3/04; B32B 31/00
(52) U.S. Cl. .................. 427/383.7; 148/533; 148/534; 148/540; 148/541; 148/546; 427/432; 427/433; 427/436; 428/939
(58) Field of Search ................................. 428/659, 939; 427/383.7, 432, 433, 436; 148/533, 534, 540, 541, 546

(56) References Cited

U.S. PATENT DOCUMENTS 4,913,785 A * 4/1990 Uchida et al.

FOREIGN PATENT DOCUMENTS

EP    1 041 167 A1  * 10/2000

EP    1041167 A1  * 10/2000  ........... C22C/38/38

OTHER PUBLICATIONS

Development of 590 MPa Grade Galvannealed Sheet Steels with Dual Phase Structure, Kawasaki Technical Report No. 42, May 2000, Yoichj Tobiyama, et al.
Development of New Formable Cold–Rolled Sheet Steels for Automobile Body Panels,Nippon Steel Technical Report No. 64 Jan. 1995, Atsushi Itami, et al.
Hot Dip Galvannealing of Interstitial Free Steel Strengthened by Manganese, Galvathech 95 Conference Proceedings–115, L. Zhang, et al., (No date).
Influence of the Dew Point of the $N_2$–$H_2$Atmosphere During Recrystallization Annealing on the Steel Surface State of TiNb High Strength Steels, 41st MWSP Conf. Proc., ISS, vol. XXXVII, 1999, I. Hertveldt, et al., (No month).

* cited by examiner

*Primary Examiner*—Robert R. Koehler
(74) *Attorney, Agent, or Firm*—Harold I. Masteller, Jr.

(57) ABSTRACT

A method of coating dual phase high strength cold rolled steel having controlled amounts of carbon, manganese, and molybdenum is used as a starting material in a galvanizing/galvannealing process. Conditions in a multi-zone furnace of the galvanizing line can be controlled in a conventional manner while still effectively coating the high strength steel. A dual phase high strength steel product is made having a uniform coating of zinc in spite of the high manganese content of the steel.

10 Claims, No Drawings

METHOD FOR COATING A STEEL ALLOY

FIELD OF THE INVENTION

The present invention is directed to a method of coating a dual phase high strength steel, and a product produced thereby, and particularly, to the use of a high strength dual phase steel containing carbon, manganese and molybdenum in a galvanizing/galvannealing process using processing conditions normally employed for low and ultra low carbon steels that do not contain easily oxidized and intentionally added alloying elements such as manganese and silicon.

BACKGROUND ART

In the prior art, it is very common to coat or galvanize steels with zinc for corrosion protection. In these galvanizing processes, the general process involves heating the steel under controlled conditions, dipping the steel into a molten bath of a coating metal such as zinc or a zinc alloy, and cooling the coated material for subsequent use.

In certain instances, the coated material can be further heated, typically known in the art as galvannealing, whereby the applied coating forms an alloy with the base steel material during the subsequent heating. Galvannealed material is advantageous in that the surface has good paint-adherence properties.

One of the problems in zinc-coating processes is the difficulty in coating high strength steels. Manufacture of high strength steels requires additions of strengthening elements. For strengthening through the formation of a dual phase microstructure (ferrite plus, primarily martensite), it is essential to make additions of such elements as Mn, Si, Mo, and Cr. Some of these elements can have a detrimental effect on the coating quality due to zinc dewetting when coated by hot dip galvanizing. Elements such as Mn, Si, and Cr that are easily oxidizable are troublesome when present above their normal low levels in steels. For example, when manganese and silicon alloying additions are made, the annealing furnace atmosphere in a continuous hot-dip coating line is reducing to iron but oxidizing to silicon and manganese. The formation of oxides of manganese and silicon, either as separate oxides or as a complex oxide, can impair zinc adhesion to the steel and produce bare (uncoated) spots on the steel surface. Other alloying additions that form more stable oxides than iron are also expected to result in similar coating difficulties during hot dip galvanizing.

The problem of coating high strength steels, particularly those containing large amounts of manganese is recognized in EP 1 041 167 to Kawasaki Steel. This publication admits that it is very difficult to manufacture high strength steel on a hot dip galvanizing line due to the presence of alloying elements added for strength, and specifically notes the problems with the presence of manganese oxides and the difficulties in zinc coating when these oxides are present.

The Kawasaki Steel EP publication attempts to eliminate the dewetting problems encountered when coating high strength steels with zinc through the use of a specific alloy and a complicated heating cycle. More particularly, Kawasaki Steel employs a particular composition in a steel sheet form and heats the composition to a prescribed level to cause dispersion of a band structure comprising a secondary phase, mainly cementite, pearlite, and bainite, and only partially martensite and residual austenite, to a prescribed extent.

Kawasaki recognizes the problems when the manganese content is high for a steel that is to be galvanized, and suggests that the steel should be first annealed on a continuous annealing line and then heated as part of the galvanizing process. Kawasaki does suggest that a single high temperature heating prior to galvanizing can be done (but provides no specifics as to such a process), and acknowledges that this type of high temperature heating deteriorates the steel surface. To avoid this problem, Kawasaki suggests a two step heating process including first heating the steel in a continuous annealing line at a temperature of at least 750° C., cooling the steel, pickling the steel surface, and then heating the steel between 650° and 950° C. just prior to dipping the steel in the galvanizing hot dip bath. As part of the second heating step, Kawasaki suggests that the dew point temperature be controlled within −50° C. and 0° C. The steel exemplified in Kawasaki utilized 2.0% by weight manganese, 0.15% by weight molybdenum, and about 0.09% carbon, and the example used a heating-pickling-heating-galvanizing process to coat the material, requiring the use of a continuous anneal line and a galvanizing line.

While Kawasaki suggests ways to avoid the problems of coating high strength steels, the proposed solutions are still disadvantageous in that a special two step processing is required. Thus, when attempting to coat these types of steels, modifications must be made to the conventional galvanizing line, or extra processing steps are required.

Another solution proposed in the prior art for the coating problems of high strength steels is electrolytically plating the steel substrate with nickel or an iron-boron alloy as described in U.S. Pat. No. 4,913,785, assigned to Nisshin Steel. Japanese Publication No. JP A 60 262950 also teaches electroplating nickel on steel substrates containing silicon and aluminum as a precursor step for galvanizing.

It has also been suggested that the hydrogen content in the annealing furnace be increased to prevent zinc dewetting on manganese-containing high strength interstitial free steel, see "Hot Dip Galvannealing of Interstitial Free Steel Strengthened by Manganese," Zhang et al., Galvatech '95 Conf. Proc., pp. 115–120. It has also been reported that the dew point of the annealing atmosphere should be increased to improve zinc dewetting on a high strength Mn-containing Ti—Nb interstitial free steel substrate, see "Influence of the Dew Point of the N2—H2 Atmosphere during Recrystallization Annealing on the Steel Surface of TiNb IF High Strength Steels', Hertveldt et al., $41^{st}$ MWSP Conf. Proc., ISS, Vol. XXXVIII, 1999, pp. 227–234. In this article, it is suggested that increasing the dew point allows the manganese oxides to form internally in the steel rather than on the surface.

In view of the added burdens imposed by the various prior art solutions to the problem of coating high strength steels and particularly zinc dewetting, a need still exists for simpler yet effective methods to coat these types of steels. The present invention responds to this need via the discovery that conventional galvanizing/galvannealing processing conditions can be used when galvanizing/galvannealing a manganese-molybdenum-carbon-containing dual phase high strength steel composition.

SUMMARY OF THE INVENTION

Accordingly, it is a first object of the present invention to provide a method of coating high strength dual phase steels using galvanizing processing conditions that would typically be employed on steels that do not contain alloying element that are easily oxidized.

Another object of the present invention is a method of coating a high strength dual phase steel, wherein the steel is a dual phase high strength type that contains controlled amounts of carbon, manganese, and molybdenum.

A still further object of the invention is a galvanized or galvannealed dual phase high strength steel made by the inventive method, preferably one having a tensile strength ranging between about 500 and 700 MPa.

Yet another object of the present invention is a method of hot-dip coating a high strength dual phase steel using a multi-zone furnace wherein the dew point temperature in the furnace varies within a range in the zones and between zones without adversely affecting the quality of the zinc coating on the steel material.

Other objects and advantages of the present invention will become apparent as a description thereof proceeds.

In satisfaction of the foregoing objects and advantages, the present invention is an improvement in galvanizing/galvannealing high strength dual phase steel. The invention uses a dual phase high strength steel employing manganese, carbon, and molybdenum in a hot-dip coating process utilizing conditions normally employed for steels of lower strength and/or ones having a single phase. The dual phase high strength steel can be effectively and uniformly coated with zinc or a zinc alloy without the need for special annealing conditions or other processing steps. The coated steel lacks the presence of bare spots that would normally be expected when this type of steel is galvanized.

According to the invention, a dual phase cold rolled steel alloy having a composition consisting essentially of, in weight percent:

carbon between about 0.05 and 0.12% manganese between about 1.0 and 1.6%;

phosphorus up to 0.04%;

sulfur up to 0.02%;

silicon up to 0.10%;

molybdenum between about 0.15 and 0.35%;

aluminum between about 0.01 and 0.08%; and the balance being iron and incidental impurities, is subjected to a conventional hot-dip coating treatment normally used for coating low and ultra low carbon cold rolled steels material with zinc. The method entails first heating a fully hard cold worked steel material in a hot-dip coating line multi-zone reducing atmosphere furnace having a furnace temperature controlled between 760 and 870° C., cooling at a controlled rate to the temperature of a zinc-containing molten bath and then dipping the steel material in the zinc-containing molten bath to produce a zinc coated steel product. As part of the galvanizing process, the furnace conditions in a multi-zone furnace upstream of the galvanizing bath are controlled in temperature and dew point in the same manner as done for lower strength steels lacking easily oxidizable elements such as intentionally-added alloying amounts of manganese and silicon.

For example, in a conventional galvanizing line, the dew point may fluctuate considerably across the length of the furnace (as much as 28° C.) and may also fluctuate in specific zones of the furnace. Further, the dew point can often exceed −30° C. However and quite remarkably, these temperatures or variations do not adversely affect the surface quality of the dual phase steel having the composition listed above. For a multi-zone furnace having a preheating zone, a heating zone, a soaking zone, and a cooling zone, and the dew point temperature for each zone preferably ranges between −50 and −20° C. for preheating; −50 and −20°C. for heating; −55 and −25° C. for soaking; and −55 and −20° C. for convection cooling.

The carbon content of the steel can range between about 0.05 and 0.12%, depending on the tensile strength desired, the molybdenum content can range between about 0.20 and 0.33%, and the manganese content can range between about 1.20 and 1.60%.

The zinc-coated steel product can be subjected to a galvanizing anneal after the dipping step to form a galvannealed steel product. The cold worked steel material can be made by ingot or continuous casting. Preferably, the material is first continuously cast into a strand, the strand is then heated and hot rolled and coiled into a strip, and the strip is cold rolled such that the steel is in the fully hard condition for the annealing and dipping steps.

It is preferred that the steel have a dual phase microstructure of ferrite and, primarily martensite.

The invention also includes the zinc coated dual phase high strength steel produced under conventional coating conditions. The zinc coating can be either a galvanized type or a galvannealed type. The coated steel should have a tensile strength between 500 and 700 MPa, and in some instances at least about 590 MPa.

DESCRIPTION OF THE PREFERRED EMBODIMENTS OF THE INVENTION

The present invention offers significant improvements in the field of coating high strength dual phase steels. As is recognized in the prior art, these steels typically contain large amounts of manganese, and coating conditions must be strictly controlled, and/or additional processing steps must be employed to avoid the creation of manganese oxides on the steel surface prior to coating.

The present invention overcomes these drawbacks by first employing a dual phase high strength steel composition having controlled amounts of carbon, manganese, and molybdenum to achieve target mechanical properties. Surprisingly, this steel type and composition can be used in a galvanizing line that employs control parameters that are used for other grades of more easily-coated steel, e.g., lower strength steels such as low and ultra low carbon steels that lack oxidation-prone alloying elements such as intentionally-added manganese and silicon. In these low or ultra low carbon steel types where manganese and silicon are not employed in specific alloying amounts, the levels of manganese and silicon are typically in normal residual amounts, e.g., no more than about 0.50% manganese and no more than about 0.1% silicon.

According to the invention, the same galvanizing conditions for these lower strength and less-alloyed steels can be used to process a manganese and molybdenum-containing high strength dual phase steel. The ability to use conventional hot-dip coating line processing conditions eliminates the need for precise controls and/or extra processing steps as is common in prior art processes. Consequently, the same galvanizing line can be utilized to produce a high strength dual phase steel as well as a steel of lesser strength. This ability results in lowered manufacturing costs, and higher profits for the coated product manufacturer.

The invention is also advantageous in providing a high strength dual phase cold rolled steel that has a uniform galvanized or galvannealed coating. Given the difficulty in coating these types of steels, having the ability to easily manufacture such a high quality coated steel is a significant advantage in the marketplace. Zinc coated steel products can be made having tensile strengths ranging between about 500 and 700 MPa. Such high strength dual phase coated steels have significant demand in sheet automotive applications.

In one embodiment, the steel for use in the invention is a dual phase high strength steel composition consisting essentially of, in weight percent:

| | |
|---|---|
| carbon | 0.05–0.12% |
| manganese | 1.0–1.6% |
| phosphorous | a maximum of 0.04% |
| sulfur | a maximum of 0.02% |
| silicon | a maximum of 0.10% |
| aluminum | 0.01–0.08% |
| molybdenum | 0.15–0.30% | with the balance iron and inevitable impurities.

Dual phase steels are well known in the prior art and the steel for use as part of the invention comprises ferrite and martensite.

Preferred ranges of the carbon content include between about 0.05 and 0.12% or alternatively, for example, between about 0.08 and 0.12% depending on the desired tensile strength. The carbon content controls the amount of martensite in the microstructure.

Manganese is also an important element in providing the strength properties and dual phase structure to the steel. Preferred levels of manganese include between 1.0 and 1.6%. More preferred ranges include 1.4 and 1.6%, with a target of around 1.5%.

Molybdenum is another important element in attaining the high strength properties of the dual phase steel while at the same time contributing to the improved coating capability. Preferred ranges include between about 0.15 to 0.35% and about 0.25 to 0.35% by weight, more preferred ranges include between about 0.20 and 0.30%, and a preferred target is about 0.25%.

The levels of sulfur, phosphorous, silicon, aluminum, and impurities are considered to be typical of the levels normally employed for these types of steels. Sulfur has a maximum of 0.02%, phosphorous has maximum of 0.04%, silicon has a maximum of 0.10%, and aluminum ranges between about 0.01 and 0.08%.

One typical target chemistry for a 590 MPa tensile strength could be, in weight percent, 0.11% C, 1.5% Mn, 0.02% P, 0.01% S, 0.05% Si, 0.04% Al, 0.30% Mo, with the balance iron and incidental impurities.

Typical mechanical properties for a steel with a target of 590–600 MPa minimum tensile strength include 380 MPa yield strength, 620 MPa tensile strength, 85 MPa bake hardening (after 2% tensile prestrain and baking at 170° C. for 20 minutes), 25% total elongation (12.5 mm gauge width), 28% total elongation (25 mm gauge width), and n values of 0.21 ($\epsilon$=4–6%), 0.18 ($\epsilon$=5–15%), and 0.16 ($\epsilon$=5%-Uniform Elong.).

The steel is processed into a fully hard cold worked or rolled form prior to galvanizing. That is, the steel is cast, either by ingot or continuous casting techniques. The cast product is then processed conventionally by hot-rolling, cold-rolling, and annealing. For hot rolling, the slab reheat temperature should be 1250° C. maximum, the finishing temperature should be 840° C. minimum, and the coiling temperature should range between about 560–730° C. For cold working, the reduction is preferably at least 50%.

In the conventional or typical galvanizing line, the galvanizing furnace is multi-zone, and comprises a preheat zone followed by a heating zone, soaking zone, and a convection cooling zone. The preheating zone furnace temperature ranges up to about 177° C., with the heating zone being controlled typically between 760° C. and 870° C. It should be understood though that the upper limit for dual phase steel galvanizing/galvannealing is 820° C. The dew point temperature of the furnace ranges between: –50 and –20° C. for preheating; –50 and –20° C. for heating; –55 and –25° C. for soaking; and –55 and –20° C. for convection cooling. A cooling rate of between 5 and 50° C./sec is used during the convection cooling section. Typically, the furnace atmosphere is about 5% hydrogen with the balance nitrogen. The dew point is monitored to stay within the prescribed ranges. The pot chemistry for galvanizing should be between about 0.1 and 0.25% aluminum, and between about 0.1 and 0.15% for galvannealing.

For galvannealing, the furnace temperature should be between about 465° and 550° C. with a line speed of 50–120 m/min. Temper reduction should be about 0.5% max. Other particulars of the casting, rolling, annealing, galvanizing/galvannealing, etc., are well known in the art, and a more detailed description is not deemed necessary for understanding of the invention.

The cold worked product as a strip or sheet can range in thickness and width as is normally used in galvanizing processes, up to 2.0 mm in thickness and up to 1830 mm in width. In addition, the cold worked/rolled steel is considered to be in its fully hard condition, not softened by annealing or the like. Since it is preferred to galvanize strip or sheet product, hereinafter, cold working will be referred to cold rolling. However, the steel material could take on other forms as would be within the skill of the artisan such that working other than rolling could be employed in anticipation of galvanizing.

As stated before, a significant advantage of the invention is the ability to use a conventional multi-zone galvanizing furnace to process the dual phase high strength steel into a coated product. When steel compositions having high levels of manganese are coated, much difficulty is encountered in controlling the presence of manganese oxides on the steel surface prior to the hot dipping step. Certain prior art indicates that it is extremely difficult to coat these materials without additional steps and controls such as shown in the Kawasaki Steel EP publication discussed above.

One way that the prior art controls the presence of manganese oxides is through dew point control in the furnace. That, it is desirable to maintain a strong reducing-type atmosphere to inhibit the formation of undesirable oxides on the surface of the material to be galvanized. For the inventive composition, theoretical calculations indicate that the dew point should be maintained around –68° C. with a range of between about –70° C. and –64° C. depending on the annealing temperature selected. However, it is difficult to control or maintain such a target dew point within a conventional multi-zone furnace, particularly since other grades of steel do not need such a tight range or high value for the dew point. For example, it is not uncommon for the dew point during conventional galvanizing to go as high as –20° C.

Surprisingly though, it was discovered that a steel composition having controlled levels of molybdenum, manganese, and carbon can be processed using typical furnace conditions as part of a typical galvanizing process. These conventional conditions treat lower strength steels such as low carbon and ultra-low carbon steels, which lack oxidation prone elements such as intentionally-added manganese and silicon. Using the steel composition identified above avoids the need for complicated processing sequence such as that suggested in the Kawasaki Steel EP publication for steels having high levels of manganese, e.g., two step processing requiring annealing, pickling, heating, and then galvanizing. Again, this finding is quite surprising since the prior art clearly suggests that it is extremely difficult to coat these high strength manganese-containing steels without special steps or conditions. Using the composition described above, a dual phase high strength steel can be produced with a uniform coating of zinc or a zinc alloy by using conventional galvanizing conditions, i.e., a coated product substantially without the bare spots commonly found in these materials when galvanized or galvannealed.

A number of studies were conducted using a steel composition and galvanizing conditions. One set of galvanizing studies was performed using simulator conditions with the second set of studies performed under mill conditions. The composition of this steel used for the studies had a target chemistry, in weight percent, of 0.11% C, 1.5% Mn, 0.02% P, 0.01% S, 0.05% Si, 0.04% Al, 0.30% Mo, with the balance iron and incidental impurities. All percent designations hereinafter are in weight percent.

In one aspect of the studies, galvanizing and galvannealing were investigated using a hot dip simulator. Because the selected alloy is high in manganese, surface oxidation during annealing and commercially practical dew points were identified as a concern. As part of this study, thermodynamic calculations were made to show the target dew point temperature range for annealing. These calculations indicated that the dew point of the 760° C. annealing atmosphere must be less than −70° C. to prevent surface oxidation of the manganese in the alloy. The problem with this target temperature is that commercial installations usually cannot effectively control the dew point to less than −57° C.

The simulator experiments for galvanizing started with a full hard material. The material was annealed at 760° C. using a typical 5%$H_2$—$N_2$ atmosphere with varying dew points of −73, −46, and −17.8° C. A galvanizing pot temperature of 454–471° C. was used with a pot aluminum content of between 0.15 and 0.20%, a target coating weight of 70/70 g/m$^2$, a dip time of about 2.6 sec (corresponding to about 330 feet/min speed through the dip tank), and maximum air cooling after dipping.

For galvannealing, the dew point was varied between −46 and −73° C., the pot temperature was 454° C., the pot aluminum was 0.135% and 0.115% saturated with iron, the coating target weight was 50/50 g/m$^2$, the dip time was 3.7 sec (230 feet/min), the galvannealing temperatures varied as 477, 504, and 527° C., and heat up and soak times were 27 and 35 seconds, respectively. Evaluations were based on a 90° bend test for adhesion, coating chemistry, and morphology.

The simulator experiments revealed that manganese oxidation occurs at dew points above −70° C., e.g., −46 and −17.8° C., but that the manganese and iron content of the oxide varies with the dew point in a complex manner. These experiments showed that the steel can be satisfactorily galvannealed in the 477–532° C. temperature range and at melt levels of from 0.1% to 0.143% aluminum. The lowest dew point used in these studies, −73° C., produced the best surface results with respect to freedom from bare spots during coating. Increasing bare spots were noted when annealing was performed at higher dew points.

The following Table relates the pin holes and surface appearance to dew point temperature as produced on the steel during the galvanizing simulator study.

| Dew Point ° C. | No. of bare spots/pin holes per side | Comments |
| --- | --- | --- |
| −73 | 0–1 | excellent adhesion and appearance |
| −46 | 3–4 | excellent adhesion and good appearance |
| −36.1 | 35 | excellent adhesion and marginal appearance |
| −17.8 | >50 | unacceptable appearance |
| 0.206% pot aluminum content | | |

From the simulator study and based on the Table results, it was believed that this grade of steel was not amenable to galvanizing or galvannealing because the requirements for control of the dew point temperature, i.e., −70° C. or lower, were not feasible on conventional galvanizing lines. Typically, the dew points in these lines vary substantially between the various furnace zones, e.g., from around −29° C. in one zone to up to near only −51° C. in another zone. With such a variance in dew points and lack of precise control to maintain low dew points, i.e., less than −70° C. along the length of the furnace, it was thought that this steel was not a good candidate for galvanizing/galvannealing.

In conjunction with the simulator studies, further testing was performed using a commercial line. The commercial line included those components typically used in a galvanizing/galvannealing line, including a furnace having an unfired strip preheater section, a radiant tube heating section, a radiant tube soaking section, and a gas jet cooling section just upstream of the galvanizing coating pot. Components downstream of the galvanizing coating pot included coating knives using air or nitrogen, and then the galvannealing furnace, the galvannealing soak section, and the cooling sections. Following the cooling components, the line included temper rolling, and tension leveling stations, and then coiling and/or surface treating stations as are found in most conventional lines. It should be understood that the components making up the galvanizing/galvannealing line are well known in the art, and a further description thereof is not deemed necessary for understanding of the invention.

In conducting the commercial line study, the conditions used for galvanizing were as follows:

| | |
| --- | --- |
| coil size | 1.3 mm thick by 1525 mm wide |
| dew point targets T° C. (typical) | preheat −26; heat −41; soak −54; convecool −51 |
| line speed | 100 meters/min. |
| annealing T° C. | 785° C. |
| pot temperature | 468° C. |
| pot aluminum | 0.164% aluminum 0.039% iron |
| coating weight | 74/85 g/m$^2$, |
| coating comp. | top 0.30% aluminum, 1.11% iron, bal. zinc bottom 0.29% aluminum, 1.05% iron, bal. zinc |
| temper mill | 0.5% extension |

The steel was also subjected to two galvannealing runs, wherein the conditions for the first run were as follows:

| | |
| --- | --- |
| coil size | 1.3 mm thick by 1525 mm wide |
| dew point target T° C. (typical) | preheat −29; heat −41; soak −46; convecool −36 |

-continued

| | |
|---|---|
| line speed | 65 meters/min. |
| annealing T° C. | 785° C. |
| coating weight | 53/54 g/m², |
| coating comp. | top 11.6% iron |
| | bottom 13.6% iron |
| temper mill | 0.5% extension |

(pot temperature and pot aluminum were not recorded but are believed to be similar to those used in conventional galvannealing and are also similar to the following run)
The second galvannealing run conditions were as follows:

| | |
|---|---|
| coil size | 1.22 mm thick by 1525 mm wide |
| dew point ranges T° C. | preheat −24; heat −27; -soak −36; and convecool −33 |
| line speed | 65 meters/min. |
| coating target weight | 53/54 g/m² |
| annealing T° C. | 785° C. |
| galvanneal furnace exit | 460–477° C. |
| pot chemistry | 0.143% aluminum, 0.03% iron |
| coating comp. | top 9.6–10.1% iron |
| | bottom 9.9–10.0% iron |
| temper mill | 0.5% extension |

Quite remarkably in view of the variance and relatively high dew point temperatures of the furnaces in each run, each of the galvanized and galvannealed steels exhibited superior surfaces. The large number of bare spots present during the simulator runs when the dew point was higher than −46° C. were noticeably absent. In fact, the surface of each product was good in that there were substantially no discernible bare spots. For the galvanneal runs, the galvanneal coating was fully alloyed and devoid of bare spots. Coating adhesion using the 90° bend mass loss test for this run was also good (all sections tested under 5 mg loss), as was the visual rating, i.e., ≦3.

These results are quite surprising given the high content of the manganese in the steel. One would expect based on the theoretical calculations and the simulator tests noted above that the dew point target temperatures and ranges in the conventional line would be too high to produce a quality and good surfaced product. The discovery that a high strength dual phase steel can be effectively coated via galvanizing and galvannealing is a significant advance in the art. Heretofore, coating these high strength steels has been difficult at best using conventional conditions. As explained in the Kawasaki EP publication, other and non-conventional steps are required in order to coat these types of steels.

While the exact mechanism is unknown as to why the dual phase high strength steel is coating-friendly under dew point conditions used for low and ultra low carbon steels lacking oxidation-prone elements such as manganese and silicon, it is believed that the increased levels of molybdenum may contribute to the suppression and/or modification of the characteristics of manganese oxides on the steel surface. However, given the complexity of the coating process in general, the exact reason may be a number of processing and alloying element factors together.

The commercial line studies show that the steel can be exposed to a wide variation in the dew point temperature without a loss in surface appearance. In both runs, the dew point was as high as −26° C. in the preheat section, and varied 28° C. along the furnace length, −26° C. to −54° C. In general, conventional furnaces can control to about −57° C., but the steel can be subjected to considerably higher dew points over the length of the furnace, particularly during preheating. However, when using the specified dual phase high strength steel, dew point control is less critical, and conventional dew point controls and ranges can be utilized for effectively coating this dual phase high strength material.

The results of the studies clearly show that a dual phase high strength cold rolled steel could be subjected to swings in furnace dew point temperature and higher than expected dew point temperatures in general, and produce an acceptable zinc-coated steel material.

As such, an invention has been disclosed in terms of preferred embodiments thereof which fulfills each and every one of the objects of the present invention as set forth above and provides a new and improved zinc coated steel composition having high strength and a dual phase, and a method of making.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. In a method of coating low and ultra low carbon cold rolled steels material with zinc by first heating a fully hard cold worked steel material in a galvanizing line multi-zone reducing atmosphere furnace having a furnace temperature controlled between 760 and 820° C., and then dipping the heated steel material in a zinc-containing molten bath to produce a zinc coated steel product, the improvement comprising maintaining the same reducing atmosphere furnace conditions but using a high strength dual phase steel composition as the fully hard cold worked steel, the composition consisting essentially of, in weight percent, carbon between about 0.05 and 0.12%;
manganese between about 1.0 and 1.6%;
phosphorus up to 0.04%;
sulfur up to 0.02%
silicon up to 0.10%;
molybdenum between about 0.15 and 0.35%;
aluminum between about 0.01 and 0.08%; and
the balance being iron and incidental impurities.

2. The method of claim 1 wherein carbon ranges between about 0.08 and 0.12%.

3. The method of claim 1 wherein the molybdenum ranges between about 0.20 and 0.33%.

4. The method of claim 1 wherein the manganese ranges between about 1.20 and 1.60%.

5. The method of claim 1 wherein the carbon ranges between about 0.08 and 0.12%, the molybdenum ranges between about 0.20 and 0.33%, and manganese ranges between about 1.20 and 1.60%.

6. The method of claim 1, wherein the zinc-coated steel product is subjected to a galvanizing anneal after the dipping step to form a galvannealed steel product.

7. The method of claim 1, wherein the cold worked steel material is made by ingot or continuous casting.

8. The method of claim 1, wherein the cold worked steel if first continuously cast into a strand, the strand is then heated and hot rolled and coiled into a strip, and the strip is cold rolled such that the steel is in the fully hard condition for the annealing and dipping steps.

9. The method of claim 1, wherein the high strength steel has a tensile strength ranging between about 500 and 700 MPa and a dual phase structure comprised of ferrite and martensite.

10. The method of claim 1, wherein the multi-zone furnace has a preheating zone, a heating zone, a soaking zone, and a cooling zone, and a dew point temperature for each zone ranges between −50 and −20° C. for preheating; −50 and −20° C. for heating; −55 and −25° C. for soaking; and −55 and −20° C. for convection cooling.

* * * * *